United States Patent Office
3,163,661
Patented Dec. 29, 1964

3,163,661
GEM-DIFLUOROSTEROIDS OF THE PREGNANE AND ANDROSTANE SERIES
John S. Tadanier, Chicago, and John Wayne Cole, Deerfield, Ill., assignors to Abbott Laboratories, North Chicago, Ill., a corporation of Illinois
No Drawing. Filed Oct. 5, 1960, Ser. No. 60,558
10 Claims. (Cl. 260—397.3)

The present invention relates to a new group of steroids. More particularly, it relates to a new series of fluorinated androstanes and pregnanes.

According to the present invention, compounds of the structure

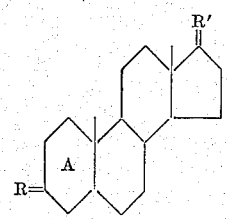

are provided, wherein R' is

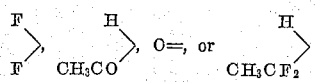

and wherein the A ring has one of the following structures:

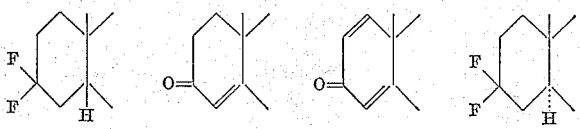

with the further provision that at least one of the radicals R and R' contains fluorine.

The above compounds are referred to in the following as gem-difluorosteroids, since all of the compounds with which the present invention is concerned contain the gem-difluoro group in one or more positions in the steroid structure. The gem-difluoro group is a structural unit comprising two fluorine atoms attached to a single position of a structure. Difluoro-compounds and tetrafluoro-compounds are included in the above group of gem-difluorosteroids.

These gem-difluorosteroids are useful for their hormonal activity. They are androgens with secondary effects in influencing hormone metabolism.

For the preparation of these gem-difluorosteroids, dioxosteroids, as starting materials, are dissolved in a nonaqueous solvent such as chloroform and mixed with sulfur tetrafluoride in the presence of a catalytic amount of hydrogen fluoride or boron trifluoride. When hydrogen fluoride is used in may be added directly as such. However, it may alternatively be formed in situ by adding a trace of a hydroxy compound, e.g. water, methanol, isopropanol, phenol, etc., which by reaction with sulfur tetrafluoride produces the required catalytic amount of hydrogen fluoride. When boron trifluoride is used, it is added directly to the reaction mixture. The desired reactions take place solwly at room temperature and more rapidly at elevated temperatures. We have found that about 40° C. is a preferred temperature for the formation of gem-difluorosteroids. Other non-aqueous solvents, for example, ethyl ether, acetonitrile or carbon tetrachloride, will be apparent to those skilled in the art.

The compounds of the present invention are made from the appropriate 3,17-dioxosteroids or 3,20-dioxosteroids and sulfur tetrafluoride. A detailed description of the production of the new compounds is found in the following examples, which are meant to be illustrations only and do not constitute the only embodiments of the present invention.

EXAMPLE 1

3,3,17,17-Tetrafluoro-5α-Androstane

A solution of 2.06 g. of 5α-androstane-3,17-dione in 20 ml. of chloroform containing 3% ethanol is heated at 40° C. in a stainless steel pressure cylinder with 10.6 g. of sulfur tetrafluoride for 15 hours. The gaseous products are removed and the residue is washed into a 500-ml. separatory funnel with five 50-ml. portions of chloroform. The resulting chloroform solution is washed with two 100-ml. portions of water, 100 ml. of 5% sodium bicarbonate solution, and finally with two 100-ml. portions of water. The chloroform solution, after drying over anhydrous magnesium sulfate, is concentrated under partial vacuum on a steam bath, leaving 2.51 g. of a dark brown tar. This material is heated with 60 ml. of boiling ethanol and is subsequently treated with carbon and filtered through celite. The carbon/celite filter cake is washed with 100 ml. of boiling ethanol and the washings combined with the previous ethanol solution. The solution is stripped of solvent under partial vacuum on a steam bath, leaving 1.38 g. of a deep red oil which crystallizes on standing. This material is chromatographed using first a column of 48.0 g. of alumina and benzene/hexane (1:10) for elution; and then a column of 80.0 g. of silica. Eluting the silica column with chloroform/hexane (1:5) yields 254 mg. of white crystals, which are recrystallized from ethanol/water to yield 218 mg. of 3,3,17,17-tetrafluoro-5α-androstane of melting point 84–5° C. The infrared absorption spectrum is in good agreement with the expected pattern for this structure. The analytical values indicate the empirical formula $C_{19}H_{28}F_4$.

EXAMPLE 2

3,3-Difluoro-5αAndrostan-17-one

The silica column used in the chromatography of Example 1 is further eluted with chloroform to produce 1.0 g. of crystals which are recrystallized from ethanol/water to yield 823 mg. of 3,3-difluoro-5α-androstan-17-one white crystals with a melting point of 123–4° C. The found analytical values of 73.67% C, 9.07% H and 12.18% F are in correspondence with the values calculated for the compound of the empirical formula $C_{19}H_{28}F_2O$.

EXAMPLE 3

3,3,20,20-Tetrafluoro-5α-Pregnane

The process of Example 1 is repeated but by substituting 2.0 g. of 5α-pregnane-3,20-dione for the dioxosteroid of Example 1. By following the outlined procedure, 1.48 g. of dark orange crystals are obtained after stripping off the solvent. Upon chromatography on 50.0 g. of alumina and elution with benzene/hexane (1:10), a yield of 1.3 g. of an orange crystalline solid melting at 130–6° C. is obtained. This material is chromatographed on 80.0 g. of silica gel which by elution with chloroform/hexane (1:5) yields 120 mg. of a white crystalline solid. Recrystallization of this material from ethanol/water produces 102 mg. of 3,3,20,20-tetrafluoro-5α-pregnane melting at 120–1° C. This compound analyzes 69.80% C and 8.67% H, corresponding to the calculated values for the empirical formula $C_{21}H_{32}F_4$.

EXAMPLE 4

3,3-Difluoro-5α-Pregnan-20-One

By eluting the silica gel of Example 3 with chloroform, 1.1 g. of a light orange, crystalline solid is obtained. This material is recrystallized from ethanol to yield 710 mg.

of 3,3-difluoro-5α-pregnan-20-one of melting point 143–7° C. Its infrared spectrum in chloroform solution shows an absorption maximum at 1703 cm.$^{-1}$. An analytically pure sample prepared by recrystallization from chloroform melts at 145–7° C. and analyzes 74.76% C, 9.82% H and 11.04% F, corresponding to the calculated values for the compound of the empirical formula $C_{21}H_{32}F_2O$.

EXAMPLE 5

*3,3,20,20-Tetrafluoro-5β-Pregnane*

Heating 2.0 g. of 5β-pregnane-3,20-dione in 20 ml. of chloroform containing 3% ethanol with 10.6 g. of sulfur tetrafluoride at 40° C. for 15 hours in the manner described in Example 1 gives 2.62 g. of a black tar. This material is heated with 50 ml. of boiling ethanol and the mixture is treated with carbon and worked up as described above, to produce 1.96 g. of a black, partially crystalline product. This material is chromatographed on 50.0 g. of alumina by elution with benzene/hexane (1:10), yielding 1.8 g. of an orange oil. The latter is then chromatographed on 80.0 g. of silica gel. Elution with chloroform/hexane (1:5) yields 166 mg. of a white, crystalline solid which shows no absorption maximum in the infrared between 1500 and 2700 cm.$^{-1}$. Two recrystallizations from ethanol/water yield 101 mg. of 3,3,20,20-tetrafluoro-5β-pregnane melting at 104.5–106.5° C. The analytical values for this compound are found to be 70.13% C, 9.20% H and 21.27% F, corresponding to the empirical formula $C_{21}H_{32}F_4$.

EXAMPLE 6

*3,3-Difluoro-5β-Pregnan-20-One*

Upon further elution of the silica gel column of Example 5 with chloroform, 1.52 g. of an orange oil is obtained. This material is recrystallized from ethanol/water using carbon for decolorization to yield 1.33 g. of a white, crystalline solid melting at 79.88° C. Recrystallization of this material from ethanol/water yields, in two crops, 630 mg. of 3,3-difluoro-5β-pregnane-20-one as fine, white needles melting at 97–99.5° C. The compound shows an absorption maximum at 1706 cm.$^{-1}$ and a melting point of the analytically pure sample of 100.5–101.5° C. The compound analyzes 74.58% C, 9.47% H and 11.26% F, corresponding with the calculated values for $C_{21}H_{32}OF_2$.

EXAMPLE 7

*3,3,17,17-Tetrafluoro-5β-Androstane*

By following the procedure outlined in Example 1, 5β-androstane-3,17-dione is fluorinated to produce 3,3,17,17-tetrafluoro-5β-androstane by elution of the silica column with benzene/hexane (1:10).

EXAMPLE 8

*3,3-Difluoro-5β-Androstan-17-One*

After elution of 3,3,17,17-tetrafluoro-5β-androstane according to Example 7, the silica gel column is further eluted with chloroform from which 3,3-difluoro-5β-androstan-17-one is recovered upon evaporation of the solvent.

EXAMPLE 9

*17,17-Difluoroandrost-4-en-3-One*

A mixture of 2.1 g. of androst-4-ene-3,17-dione, 8.0 g. of sulfur tetrafluoride, 0.4 g. of boron trifluoride, and 20.0 ml. of ethanol-free chloroform is heated 10 hours in a pressure tube at 40° C. The reaction mixture is allowed to cool to room temperature and the gaseous products are stripped. The residue is washed into a 500-ml. separatory funnel with six 50-ml. portions of chloroform. The black resin which adheres to the walls of the reaction vessel is discarded. The chloroform solution is twice washed with 100-ml. portions of water, and subsequently with 100-ml. of 5% sodium bicarbonate, and finally with two 100-ml. portions of water. The chloroform solution is dried over anhydrous magnesium sulfate and the chloroform is stripped under partial vacuum on a steam bath to leave 1.15 g. of a black, crystalline residue. This material is heated with 80.0 ml. of boiling ethanol, decolorized with carbon, and filtered through celite. The carbon/celite mat is washed with three 25-ml. portions of boiling ethanol and the washings are added to the original ethanol filtrate. The ethanol is stripped under partial vacuum on the steam bath, leaving 0.611 g. of a brown oil which readily crystallizes upon cooling. This material is chromatographed on 70.0 g. of alumina and eluted with benzene/hexane (1:1), yielding 277 mg. of a pale yellow, crystalline solid. This material is crystallized from ethanol/water to yield 227.3 mg. of 17,17-difluoroandrost-4-en-3-one melting at 178–180.5° C. showing infrared absorption maxima at 1668 and 1622 cm.$^{-1}$. For analysis, this material is recrystallized twice from ethanol/water to yield 160 mg. melting at 181–182.8° C. The substance analyzes 73.84% C and 8.41% H corresponding to the calculated values for $C_{19}H_{26}OF_2$.

EXAMPLE 10

*17,17-Difluoroandrosta-1,4-Dien-3-One*

When treated by the process of Example 9, 2.0 g. of androsta-1,4-diene-3,17-dione is converted to 66.4 mg. of 17,17-difluoroandrosta-1,4-dien-3-one, as a first crop from ethanol/water crystallization, melting at 116–17° C. The analytical values correspond to those calculated for the empirical formula $C_{19}H_{24}F_2O$.

EXAMPLE 11

*20,20-Difluoropregn-4-en-3-One*

A mixture of 2.0 g. progesterone, 8.0 g. of sulfur tetrafluoride, 0.4 g. of boron trifluoride, and 20 ml. of ethanol-free chloroform are heated for 10 hours to 40° C. in a stainless steel pressure cylinder. After removing gases and solvents as in the previous examples, the residue is washed into a 500-ml. separatory funnel with several portions of chloroform. The total volume of the chloroform solution of about 250 ml. is washed with two 100-ml. portions of water, 100 ml. of 5% sodium bicarbonate, and two 100-ml. portions of water. The chloroform solution is dried over anhydrous magnesium sulfate and the chloroform is stripped under partial vacuum on a steam bath to leave 745 mg. of a brown tar. This material is dissolved in 50 ml. of boiling ethanol, treated with carbon and filtered through celite. The filtered residue is washed with 80 ml. of ethanol and the wash liquid is combined with the original ethanol filtrate. The ethanol is stripped under partial vacumm leaving 460 mg. of a clear orange oil which partially crystallizes on standing. This material is chromatographed on 40 g. of alumina and eluted with benzene/hexane (1:1) to yield 50 mg. of a pale orange, crystalline solid melting at 103.5–110° C. with infrared absorption maxima at 1672 and 1620 cm.$^{-1}$. It is recrystallized from ethanol/water to yield 36.4 mg. of 20,20-difluoropregn-4-en-3-one melting at 108.5–110° C. An analytical sample of this material shows 75.15% C, 8.95% H and 11.55% F, corresponding to the calculated values for $C_{21}H_{30}OF_2$.

EXAMPLE 12

*20,20-Difluoropregna-1,4-Dien-3-One*

In analogy to the procedure shown in Example 11, pregna-1,4-diene-3,20-dione is converted into 20,20-difluoropregna-1,4-dien-3-one.

In all the above examples, the assigned structures were found to agree with the ultra-violet and infrared spectra expected for such compounds. All melting points are determined in a Fisher-Johns melting point apparatus.

Others may practice the invention in any of the numerous ways which will be suggested to one skilled in the art by the present disclosure. All such practice of the invention is considered to be a part thereof provided it falls within the scope of the appended claims.

We claim:
1. Gem-difluorosteroids of the formula

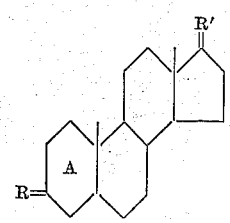

wherein R' is selected from the group consisting of

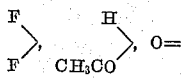

and

and wherein the A ring has a structure selected from the group consisting of

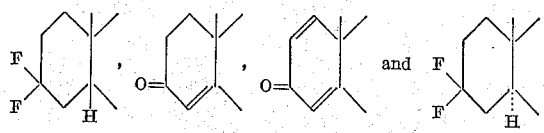

and wherein at least one of the radicals R and R' must include fluorine.

2. 17,17-difluoroandrosta-1,4-dien-3-one.
3. 17,17-difluoroandrost-4-en-3-one.
4. 20,20-difluoropregn-4-en-3-one.
5. 20,20-difluoropregna-1,4-dien-3-one.
6. 3,3-difluoro-5α-androstan-17-one.
7. 3,3-difluoro-5β-androstan-17-one.
8. 3,3-difluoro-5α-pregnan-20-one.
9. 3,3-difluoro-5β-pregnan-20-one.
10. A compound having the formula:

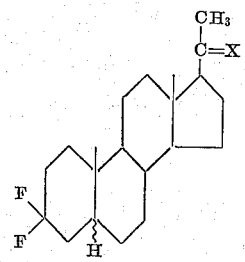

wherein X is selected from the group consisting of O and

No references cited.

LEWIS GOTTS, Primary Examiner.
L. H. GASTON, M. LIEBMAN, Examiners.